US006182247B1

(12) United States Patent
Herrmann et al.

(10) Patent No.: US 6,182,247 B1
(45) Date of Patent: Jan. 30, 2001

(54) EMBEDDED LOGIC ANALYZER FOR A PROGRAMMABLE LOGIC DEVICE

(75) Inventors: Alan L. Herrmann, Sunnyvale; Greg P. Nugent, Menlo Park, both of CA (US)

(73) Assignee: Altera Corporation, San Jose, CA (US)

( * ) Notice: Under 35 U.S.C. 154(b), the term of this patent shall be extended for 0 days.

(21) Appl. No.: 08/958,435

(22) Filed: Oct. 27, 1997

Related U.S. Application Data

(60) Provisional application No. 60/029,277, filed on Oct. 28, 1996.

(51) Int. Cl.$^7$ .............................. G06F 17/50; G06F 11/25
(52) U.S. Cl. ............................ 714/39; 714/725; 714/734; 702/117; 395/500.05
(58) Field of Search .................................. 714/39, 20, 31, 714/32, 45, 46, 25, 724, 725, 733, 734, 738, 33; 395/500.05, 500.17; 702/58, 59, 81, 82, 84, 83, 117

(56) References Cited

U.S. PATENT DOCUMENTS

| | | | |
|---|---|---|---|
| 4,696,004 | * | 9/1987 | Nakajima et al. ...................... 714/39 |
| 4,835,736 | * | 5/1989 | Easterday . |
| 4,847,612 | * | 7/1989 | Kaplinsky ......................... 340/825.8 |
| 5,036,473 | * | 7/1991 | Butts et al. ...................... 395/500.17 |
| 5,124,588 | * | 6/1992 | Baltus et al. ............................ 326/48 |
| 5,365,165 | * | 11/1994 | El-Ayat et al. ......................... 714/25 |
| 5,425,036 | * | 6/1995 | Liu et al. .............................. 714/725 |

(List continued on next page.)

FOREIGN PATENT DOCUMENTS

4042262 * 7/1992 (DE) .

OTHER PUBLICATIONS

Marantz, Joshua, "Enhanced visibility and performance in functional verification by reconstruction", Proceedings of the 35th annual conference on Design automation conference, pp. 164–169, 1998.*

Stroud, Charles et al, "Evaluation of FPGA resources for built–in self–test of programmable logic blocks", Proceedings of the 1996 ACM fourth international symposium on Field–programmable gate arrays, p. 107, 1996.*

*Primary Examiner*—Robert W. Beausoliel, Jr.
*Assistant Examiner*—Christopher A. Revak
(74) *Attorney, Agent, or Firm*—Beyer Weaver & Thomas, LLP

(57) ABSTRACT

A technique for embedding a logic analyzer in a programmable logic device allows debugging of such a device in its actual operating conditions. A logic analyzer circuit is embedded within a PLD, it captures and stores logic signals, and it unloads these signals through an interface to be viewed on a computer. Using an electronic design automation (EDA) software tool running on a computer system, an engineer specifies signals of the PLD to be monitored, specifies the number of samples to be stored, and specifies a system clock signal and a trigger condition that will begin the acquisition of data. The EDA tool then automatically inserts the logic analyzer circuit into the electronic design of the PLD which is compiled and downloaded to configure the PLD. Using an interface connected between the PLD and the computer, the EDA tool communicates with the embedded logic analyzer in order to arm the circuit and to poll it until an acquisition has been made. The EDA tool then directs the logic analyzer to unload the data from its capture buffer and then displays the data on the computer. The logic analyzer circuit may then be rearmed to capture another sequence of sample values. The trigger condition may be changed without recompiling. The design may be recompiled with new logic analyzer parameters to debug a different portion.

51 Claims, 7 Drawing Sheets

U.S. PATENT DOCUMENTS

| | | | | |
|---|---|---|---|---|
| 5,452,231 | * | 9/1995 | Butts et al. | 395/500.17 |
| 5,568,437 | * | 10/1996 | Jamal | 714/718 |
| 5,572,712 | * | 11/1996 | Jamal | 714/734 |
| 5,661,662 | * | 8/1997 | Butts et al. | 395/500.17 |
| 5,764,079 | * | 6/1998 | Patel et al. | 714/725 |
| 5,821,771 | * | 10/1998 | Patel et al. | . |
| 5,870,410 | * | 2/1999 | Norman | . |
| 6,014,334 | * | 1/2000 | Patel et al. | . |
| 6,016,563 | * | 1/2000 | Fleisher | 714/725 |
| 6,020,758 | * | 2/2000 | Patel et al. | . |

* cited by examiner

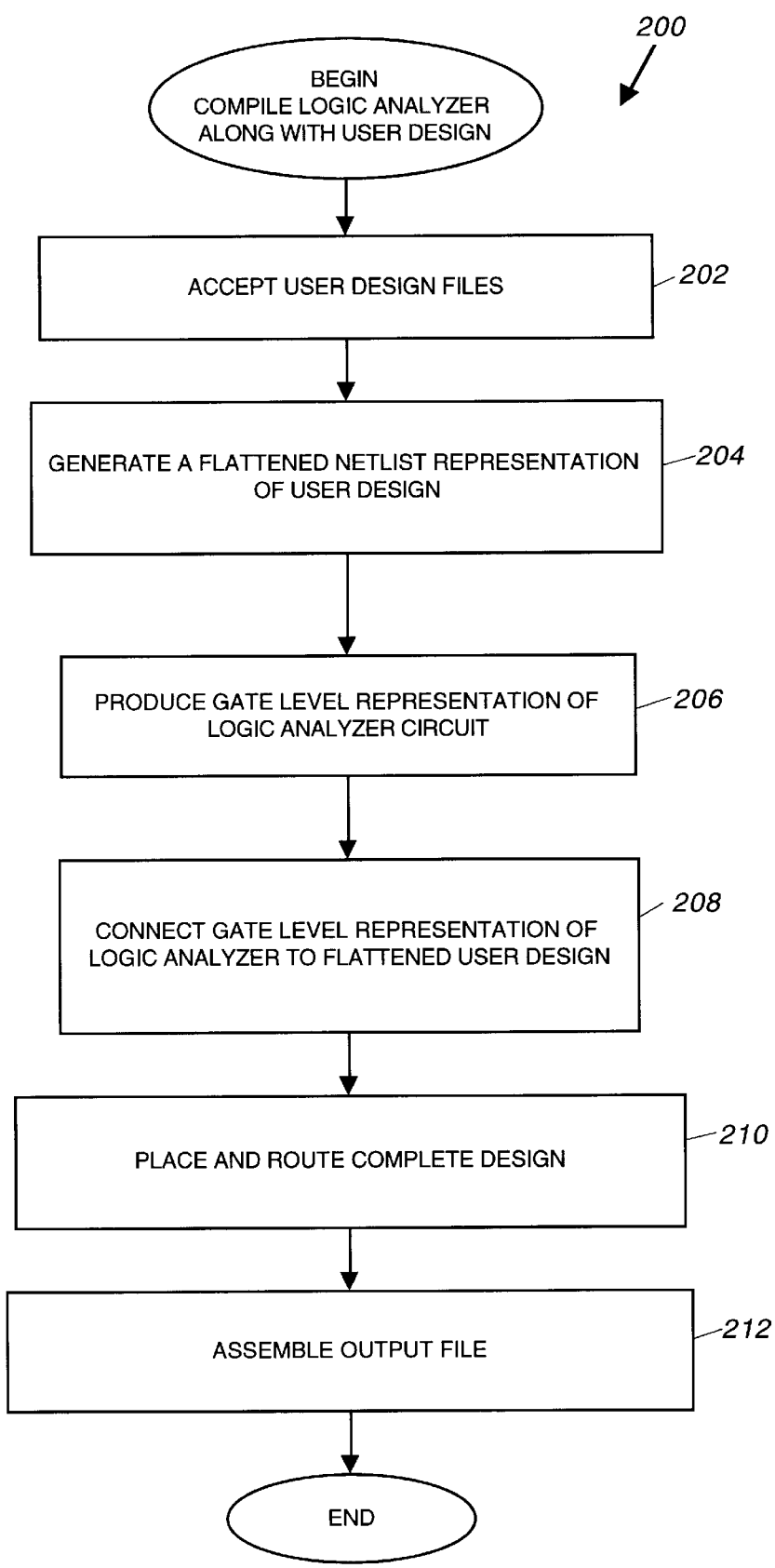

EMBEDDED LOGIC ANALYZER FOR A PROGRAMMABLE LOGIC DEVICE

This application claims priority of provisional U.S. patent application No. 60/029,277, filed Oct. 28, 1996, entitled "Tools For Designing Programmable Logic Devices" which is incorporated by reference.

The present application is related to the following applications filed on the same date herewith: U.S. patent application Ser. No. 08/958,002, naming B. Pedersen et al. as inventors, entitled "Generation Of Sub-Net Lists For Use In Incremental Compilation"; U.S. patent application Ser. No. 08/958,436, naming J. Tse et al. as inventors, entitled "Fitting For Incremental Compilation Of Electronic Designs"; U.S. patent application Ser. No. 08/958,670, naming D. Mendel as inventor, entitled "Parallel Processing For Computer Assisted Design Of Electronic Devices"; U.S. patent application Ser. No. 08/958,626, naming F. Heile et al. as inventors, entitled "Interface For Compiling Design Variations In Electronic Design Environments"; U.S. patent application Ser. No. 08/958,778, naming T. Southgate as inventor, entitled "Method And Apparatus For Automated Circuit Design"; U.S. patent application Ser. No. 08/958,434, naming T. Southgate et al. as inventors, entitled "Graphic Editor For Block Diagram Level Design Of Circuits"; U.S. patent application Ser. No. 08/958,432, naming T. Southgate et al. as inventors, entitled "Design File Templates For Implementation Of Logic Designs"; U.S. patent application Ser. No. 08/958,414, naming T. Southgate as inventor, entitled "Method For Providing Remote Software Technical Support"; U.S. patent application Ser. No. 08/958,777, naming T. Southgate as inventor, entitled "Method For Simulating A Circuit Design"; U.S. patent application Ser. No. 08/957,957, naming F. Heile et al. as inventors, entitled "Workgroup Computing For Electronic Design Automation"; U.S. patent application Ser. No. 08/958,798, naming F. Heile as inventor, entitled "Local Compilation In Context Within A Design Hierarchy"; and U.S. patent application Ser. No. 08/958,431, naming F. Heile as inventor, entitled "Electronic Design Automation Tool For Display Of Design Profile". The above related applications are incorporated herein by reference in their entireties for all purposes.

FIELD OF THE INVENTION

The present invention relates generally to analysis of a hardware device in connection with a computer system. More specifically, the present invention relates to a logic analyzer that is automatically embedded within a hardware device for purposes of debugging.

BACKGROUND OF THE INVENTION

In the field of electronics, various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of custom configurations for programmable integrated circuits. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Often, such PLDs are designed and programmed by an engineer using an electronic design automation tool that takes the form of a software package.

In the course of generating a design for a PLD, programming the PLD and checking its functionality on the circuit board or in the system for which it is intended, it is important to be able to debug the PLD because a design is not always perfect the first time. Before a PLD is actually programmed with an electronic design, a simulation and/or timing analysis may be used to debug the electronic design. However, once the PLD has been programmed and is operating within a working system, it is also important to be able to debug the PLD in this real-world environment.

And although a simulation may be used to debug many aspects of a PLD, it is nearly impossible to generate a simulation that will accurately exercise all of the features of the hardware PLD on an actual circuit board operating in a complex system. For example, a simulation may not be able to provide timing characteristics that are similar to those that will actually be experienced by the hardware PLD in a running system; e.g., simulation timing signals may be closer or farther apart than what a PLD will actually experience in a real system.

In addition to the difficulties in generating a comprehensive simulation, other circuit board variables such as temperature changes, capacitance, noise, and other factors may cause intermittent failures in a PLD that are only evident when the PLD is operating within a working system. Still further, it can be difficult to generate sufficiently varied test vectors to stress the PLD design to the point where most bugs are likely to be observed. For example, a PLD malfunction can result when the PLD is presented with stimuli that the designer did not expect, and therefore did not take into account during the design and simulation of the PLD. Such malfunctions are difficult to anticipate and must be debugged in the context of the complete system. Thus, simulation of an electronic design is useful, but usually cannot debug a PLD completely.

One approach to debugging a hardware device within a working system is to use a separate piece of hardware equipment called a logic analyzer to analyze signals present on the pins of a hardware device. (For example, the HP1670A Series Logic Analyzer from Hewlett-Packard Company.) Typically, a number of probe wires are connected manually from the logic analyzer to pins of interest on the hardware device in order to monitor signals on those pins. The logic analyzer captures and stores these signals. However, the use of an external logic analyzer to monitor pins of a hardware device has certain limitations when it comes to debugging such a device. For example, such an external logic analyzer can only connect to and monitor the external pins of the hardware device. Thus, there is no way to connect to and monitor signals that are internal to the hardware device. Unfortunately, when programming a hardware device such as a PLD, it would be useful to be able to monitor some of these internal signals in order to debug the PLD.

Although some custom hardware devices may come ready made with some internal debugging hardware, this debugging hardware is typically hardwired to route specific internal signals and cannot be readily changed by an engineer who wishes to look at other signals. Also, with such built-in debugging it is not possible to choose any signal to monitor that the engineer desires, nor can triggering signals and triggering conditions be changed by the engineer. Because a PLD by its very nature is a programmable device that an engineer is attempting to program to perform a particular function, it is important to the engineer to be able to customize monitored signals, trigger signals, and trigger conditions in order to efficiently debug any particular device. Further, creating an electronic design for a PLD is an iterative process that requires creative debugging by an engineer who may wish to view almost any internal signal, and who may change his mind fairly frequently in the course of debugging a PLD within a system. Known external and internal logic analyzers do not provide this flexibility.

A further drawback to using an external logic analyzer or hardwired predetermined debugging hardware inside of a custom chip is that often the number of internal signals that an engineer desires to monitor are greater than the number of available pins on the device. For example, if there are sixteen internal signals that an engineer wishes to monitor on a device, he is unable to do this using an external logic analyzer if the device has only four pins available for debugging.

In some cases, it is possible for an engineer to employ a conventional logic analyzer to study an internal signal of a PLD. This may be accomplished by, for example, an engineer modifying his design so that a normally internal signal is routed temporarily to an output pin of the PLD. The design is then recompiled. The engineer then attaches a probe to this output pin in order to monitor the "internal" signal. Unfortunately, the engineer must recompile his design and reprogram the PLD in order to view this internal signal. Also, when debugging is complete, the engineer must again rewrite the design to remove the internal signal from the output pin, recompile the design and finally reprogram the PLD again. This can be a tedious process.

Even if an engineer is successful in routing an internal signal to an output pin of a PLD, with certain integrated circuit packages it may be extremely difficult to attach an external logic analyzer. For an integrated circuit in a dual in-line package it may be relatively straightforward to attach the probes of a logic analyzer to the top of the package as long as the package is in an easily accessible location on a circuit board. However, if the package is in a difficult to reach location because of device crowding, it may be difficult to physically attach logic analyzer probes to particular output pins of interest. Even more troublesome are integrated circuits with rows of miniature contacts located on the top of the package (e.g., "flip chips"). It is difficult to attach logic analyzer probes to particular outputs of interest with this type of package. For an integrated circuit encased in a ball grid array package with the contacts located on the bottom of the package up against the circuit board, it may be nearly impossible to attach logic analyzer probes to these small contacts located on the underside of integrated circuit package. Thus, use of an external logic analyzer has shortcomings even if an internal signal can be routed to a pin of a device.

Therefore, an apparatus and technique are desirable that would allow a logic analyzer to flexibly analyze internal signals of interest in an electronic design.

SUMMARY OF THE INVENTION

To achieve the foregoing, and in accordance with the purpose of the present invention, a technique for embedding a logic analyzer in a programmable logic device is disclosed that allows debugging of such a device in a more efficient manner.

The present invention provides both an apparatus and a technique by which a logic analyzer circuit is automatically embedded within a PLD, by which it captures and stores logic signals, and by which it unloads these signals through an interface to a computer. In a preferred embodiment, analysis of the signals is performed on the computer, with the "on-chip" logic analyzer circuit serving only to acquire the signals. The invention works especially well with a PLD because, by its very nature, a PLD is able to be programmed with a design, the design may be changed, and the PLD programmed again and again. Thus, the logic analyzer circuit may be embedded in test designs or iterations in the process of designing a final PLD. Upon successful debugging of the PLD design, the PLD chip can be reprogrammed without the logic analyzer circuit, or the circuit can be left on the chip.

In one embodiment of the invention, using an electronic design automation (EDA) software tool running on a computer system, an engineer specifies signals of the PLD to be monitored, specifies the number of samples to be stored, and specifies a system clock signal and a trigger condition that will begin the acquisition of data. The EDA tool then automatically inserts the logic analyzer circuit into the electronic design of the PLD which is compiled and downloaded to configure the PLD. Using an interface connected between the PLD and the computer, the EDA tool communicates with the embedded logic analyzer in order to arm the circuit and to poll it until an acquisition has been made. The EDA tool then directs the logic analyzer to unload the data from its capture buffer and then displays the data on the computer. The logic analyzer circuit may then be rearmed to capture another sequence of sample values.

The present invention provides many advantages over the prior art. Use of an embedded logic analyzer in a PLD allows debugging of the device in the system in which it is operating and under the actual conditions that might produce a malfunction of the PLD. The technique of the present invention automatically embeds a logic analyzer circuit into a PLD so that an engineer may debug any logic function within the device. The embedded logic analyzer is able to capture any internal signals specified by the engineer; the triggering condition can also include any specified internal signals. Through the use of memory within the embedded logic analyzer and a serial interface to the computer, any number and depth of signals can be monitored within the device and then transmitted to the computer at a later time for analysis. In one embodiment of the invention, as few as four pins on a PLD are used to program the embedded logic analyzer and to transmit captured signal information to the computer.

Advantageously, while debugging a PLD design in a system, an engineer may use the EDA tool to specify new signals to monitor and/or new triggering conditions. The engineer can then reprogram the device while it is within its intended system with a modified logic analyzer circuit very rapidly in order to debug a different portion of the device or to change the triggering conditions. This ability to reprogram an embedded logic analyzer on the fly has many advantages over built-in debugging hardware on custom chips that may not be dynamically reprogrammed. This ability to reprogram also has advantages over external logic analyzers that can only monitor the external pins of a hardware device. Furthermore, once an engineer has finished debugging the device with the embedded logic analyzer, the EDA tool may be used to generate a final configuration output file without the logic analyzer that represents the engineer's final working design. Thus, the logic analyzer need not be part of the final design and take up space on the PLD.

The present invention is applicable to a wide range of hardware devices, and especially to PLDs. A PLD in particular may be implemented using a wide variety of technologies, including SRAM technology and EEPROM technology. PLDs based upon SRAM technology are especially advantageous in that they may have additional embedded memory that can be used by the embedded logic analyzer to capture a large number of, and a greater depth of signals. Furthermore, an embedded logic analyzer that is designed and inserted automatically by an EDA tool means that an engineer does not require an external logic analyzer as a separate piece of equipment. Furthermore, the engineer may use the computer on which he or she is creating a design for the PLD to also control and configure the embedded logic analyzer and to review its results.

In one embodiment of the present invention, a number of pins on the PLD are dedicated interface pins for communication with the user computer. Because these pins are dedicated for the interface, and are known ahead of time, they may be routed to an easily accessible location or port on a circuit board, such that a debugging interface cable may be connected from the user computer to these pins extremely easily. This technique is especially advantageous where pins or contacts of a particular integrated circuit in a package may be difficult or nearly impossible to reach. Because the embedded logic analyzer of the present invention may be configured to monitor any internal or external signals of the PLD, all of these monitored signals are available for analysis through these interface pins. In other words, it is not necessary to physically connect a probe to a particular external pin of interest because any signal within the PLD can be monitored, stored within the memory of the embedded logic analyzer and then later uploaded to the user computer for analysis through these dedicated interface pins.

Additionally, an embedded logic analyzer can be used with PLDs that are configured to near capacity. An engineer can temporarily remove a portion of the design unrelated to the problem under analysis, embed a logic analyzer circuit, and then debug the PLD. Once the PLD has been debugged, the engineer may then remove the embedded logic analyzer and reinsert that section of the design that he had temporarily removed.

BRIEF DESCRIPTION OF THE DRAWINGS

The invention, together with further advantages thereof, may best be understood by reference to the following description taken in conjunction with the accompanying drawings in which:

FIG. 4 is a flowchart describing a technique by which a logic analyzer may be compiled along with a user's design to embed the logic analyzer within a hardware device.

DETAILED DESCRIPTION OF THE INVENTION

In order to develop a design for programming an electronic design such as a programmable logic device (PLD), a programmable logic development system is used. As used herein, "electronic design" refers to circuit boards and systems including multiple electronic devices and multichip modules, as well as integrated circuits. For convenience, the following discussion will generally refer to "integrated circuits", or to "PLDs", although the invention is not so limited.

Programmable Logic Development System

Figure 1:
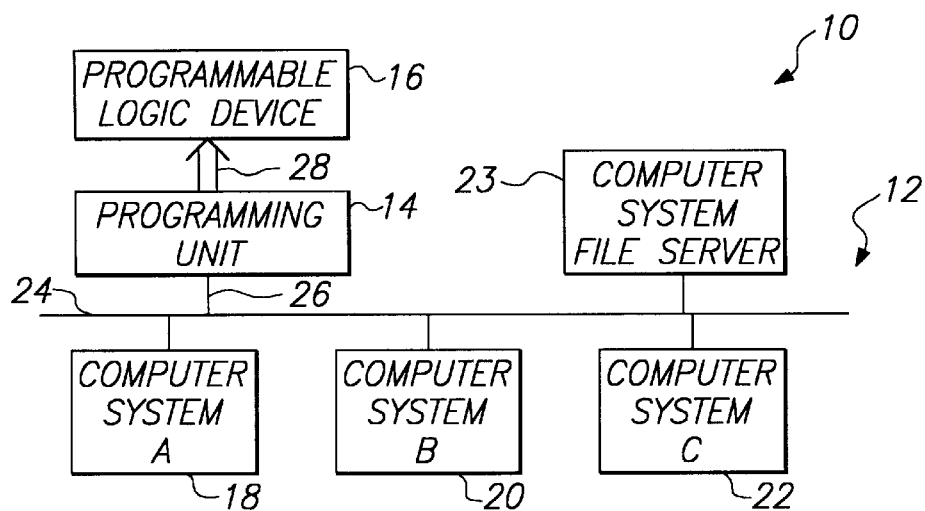
FIG. 1 is a block diagram of a programmable logic development system according to one embodiment of the present invention.

FIG. 1 is a block diagram of an embodiment of a programmable logic development system 10 that includes a computer network 12, a programming unit 14 and a programmable logic device 16 that is to be programmed. Computer network 12 includes any number of computers connected in a network such as computer system A 18, computer system B 20, computer system C 22 and computer system file server 23 all connected together through a network connection 24. Computer network 12 is connected via a cable 26 to programming unit 14, which in turn is connected via a programming cable 28 to the PLD 16. Alternatively, only one computer system could be directly connected to programming unit 14. Furthermore, computer network 12 need not be connected to programming unit 14 at all times, such as when a design is being developed, but could be connected only when PLD 16 is to be programmed.

Programming unit 14 may be any suitable hardware programming unit that accepts program instructions from computer network 12 in order to program PLD 16. By way of example, programming unit 14 may include an add-on logic programmer card for a computer, and a master programming unit, such as are available from Altera Corporation of San Jose, Calif. PLD 16 may be present in a system or in a programming station. In operation, any number of engineers use computer network 12 in order to develop programming instructions using an electronic design automation software tool. Once a design has been developed and entered by the engineers, the design is compiled and verified before being downloaded to the programming unit. The programming unit 14 is then able to use the downloaded design in order to program PLD 16.

For the purposes of debugging a PLD according to an embodiment of the present invention, any of the computers shown or others may be used to specify a logic analyzer circuit and to compile such circuit along with a user's design. Furthermore, programming cable 28 may be used to control the logic analyzer and to receive data from it, or a separate debugging cable may be used to directly connect a computer with device 16.

Such a programmable logic development system is used to create an electronic design. Design entry and processing occurs in the context of a "project". A project includes a project file, design files, assignment files, and simulation files, together with hierarchy information, system settings, and output files, which includes programming files and report files. A project database may also exist, which contains intermediate data structures and version information.

A project contains one or more hierarchies of design entities and each design hierarchy tree has a root entity, which is the topmost design entity in that hierarchy tree (the top-level functional block). Other design entities in the design hierarchy tree are called child entities. Also, a design hierarchy may contain entities for which there is no corresponding design file, for example, in a top-down design methodology. That part of a hierarchy which contains such not-yet-implemented entities is not compiled or simulated until a design file is supplied for each entity. In this case, template source files are automatically generated which have defined interfaces but empty bodies to assist in implementing these parts of a project. A user creates a design by specifying and implementing functional blocks, as will now be described in the context of an exemplary design methodology.

Design Methodology

Figure 2:
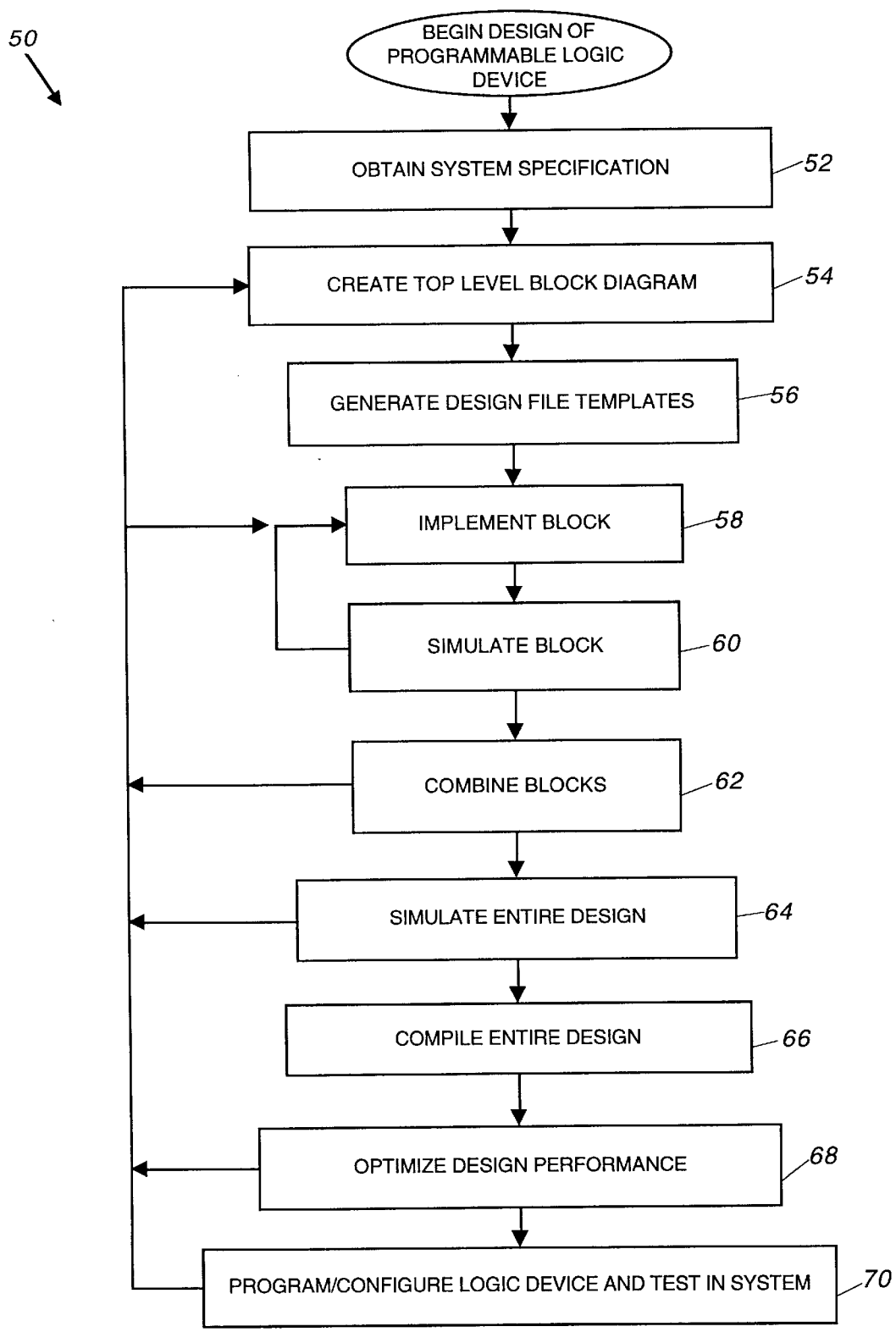
FIG. 2 is a flowchart of a design methodology used to design a programmable logic device according to one embodiment of the present invention.

FIG. 2 shows a design methodology 50 for using a system design specification in order to develop a design with which to program a PLD. It should be appreciated that the present invention may be practiced in the context of a wide variety of design methodologies. By way of example, the work group computing techniques and system of the present invention work well with an electronic design automation (EDA) software tool within the framework of the methodology of FIG. 2.

In step 52 a system specification for the PLD to be programmed is obtained. This specification is an external document or file that describes, for example, the device pin names, the functionality of each of the pins, the desired system functionality, timing and resource budgets, and the like. The multiple engineers within a work group will use this system specification in order to create a design with the EDA tool that will then be used to program a PLD.

Once the system specification is obtained, creation of a design using functional block diagrams is begun. In step 54 a top-level block diagram is created in which connections between lower-level designs blocks are specified. In this block, the target device, speed grade, and key timing requirements may be specified. Those skilled in the art will recognize that this top-level block may also include blocks that have already been developed or implemented or that have been obtained from a third party provider. This top-level block may also be converted into an HDL file, or the like, for use in other related design tools, such as an external simulator.

Step 56 includes generating design file templates with the EDA tool for all blocks present in the top-level block diagram of step 54. After the designer has created a block which has not yet been implemented, the system may generate a design file template. Such templates may display a block in a window format including, for example, a title, a date, etc. around the boundaries. It may also include some details of the functional content depicted within the window. The design file templates may be in any specified design format including VHDL, AHDL, Verilog, block diagram, schematic, or other like format. In the case of a VHDL block the template may also include much of the formatting and necessary syntax for any VHDL block. The user need only take the template and add the small portion of VHDL syntax required to implement his function. For example, the user may need only add syntax defining a particular AND gate operation. Normal design, such as VHDL or other IEEE standard, requires large amounts of text to adequately set up the design block.

Those skilled in the art will recognize that design file templates such as these can be used as starting points for the design of the structural or functional entities needed by the design. Thus, a design file template may serve as a reusable object for different instances of a block in one or more designs. More importantly, design file templates will be employed to reduce the amount of labor that the designer must expend to generate the logic in the blocks. In one embodiment, the generation of the design file templates is done in such a way that the templates can be updated later if the top-level block diagram changes.

Next, in step 58, each of the blocks of the top-level block is implemented using the EDA tool. It is noted that for more complicated designs, there may be additional levels of block diagrams (i.e., blocks within blocks). If changes are required at the top-level then the top-level block diagram is updated and the sub-designs are preferably automatically updated as well.

Furthermore, a block may be compiled through to a fitting stage for a particular integrated circuit die to provide information about resource utilization, timing performance, etc., as required for a given design. As such, it is envisioned that some timing optimization may be performed during step 58. This sequence illustrates a style of design in which an engineer first designs, then compiles and simulates, and then returns to design again if the simulation results are not satisfactory. In another style, an engineer may iterate through a number of design followed by simulation loops before finally compiling the complete design.

Concerning block implementation order, one or more of the following factors can be used to determine implementation order: (1) the complexity of a block; (2) the uncertainty or risk associated with a block; and/or (3) how far upstream and/or downstream in a given data-path the block resides. Each of steps 60, 62, 64, 68 and 70 may also lead back to this block implementation step for additional implementation necessitated by later changes in the design.

In step 60 a block is simulated functionally at the source level using a behavioral simulator and vectors generated by using a VHDL or Verilog test bench, for example. The simulation results can then be displayed or otherwise presented/recorded as waveforms, text or annotated onto the source files. The designer may also return to step 58 to implement a block again. Also, at this point a block may be compiled or a timing analysis performed.

Once the designer is satisfied with the simulation results, in step 62 the block is combined with other blocks and the resulting group is simulated together. In some cases, it may be useful to complete a full compilation to provide critical resource and timing information. Also, output simulation vectors from one block may become the input simulation vectors to the next block. The designer may also return to step 54 to modify the top-level block or to step 58 to implement a block again.

Next, in step 64, the entire design is simulated functionally at the source level using a behavioral simulator. Preferably, the top-level block diagram is fully specified before simulation and shows complete design connectivity. Vectors can be generated using a VHDL or Verilog test bench. Again, the simulation results can be displayed either as waveforms or annotated onto the source files. The designer may also return to step 54 to modify the top-level block or to step 58 to implement a block again. In step 66 the entire design is compiled through to a file containing the information needed to program a PLD to implement the user's design, such as to a "programming output file".

A wide variety of compile techniques may be used depending upon the type of design being created. By way of example, a few examples of compilation are presented below. For a PLD, compilation includes the steps of synthesis, place and route, generation of programming files and simulation. For a traditional integrated circuit design with a custom layout, compilation includes a layout version schematic, a design rule checker and simulations. For integrated circuit design using a high level design tool, compilation includes synthesis from a language such as VHDL or Verilog, automatic place and route and simulations. For printed circuit boards, compilation includes automatic routing, design rule checking, lumped parameter extraction and simulation. Of course, other types of compilation and variations on the above are possible.

Within the context of the present invention, any of the above compile techniques may be modified in order to produce an embedded logic analyzer. As will be discussed in greater detail below with reference to FIG. 4, the compilation of a PLD is modified in order to insert a logic analyzer into a user's design.

Following compilation in step 66, in step 68 the timing checker inside the compiler is used to determine if the performance goals for the design have been met. Also, timing simulations are used to check performance details. In addition, other analysis tools such as a design profiler and/or layout editor can be used to further optimize the performance of the design. Preferably, optimization is not performed prior to step 68 because full compilation is usually required to establish the location of one or more critical paths within the design. The designer may also return to step 54 to modify the top-level block or to step 58 to implement a block again.

Next, in step 70 the device is programmed/configured using programming unit 14 and tested in the system. Again, the designer may also return to step 54 to modify the top-level block or to step 58 to implement a block again. While methodology 50 presents a top-down design process, it may also be used to support a bottom-up type methodology. Now that a general design methodology has been described by which an engineer may develop a design for a PLD, a technique for embedding a logic analyzer within a PLD will now be discussed.

Embedded Logic Analyzer

Figure 3A:
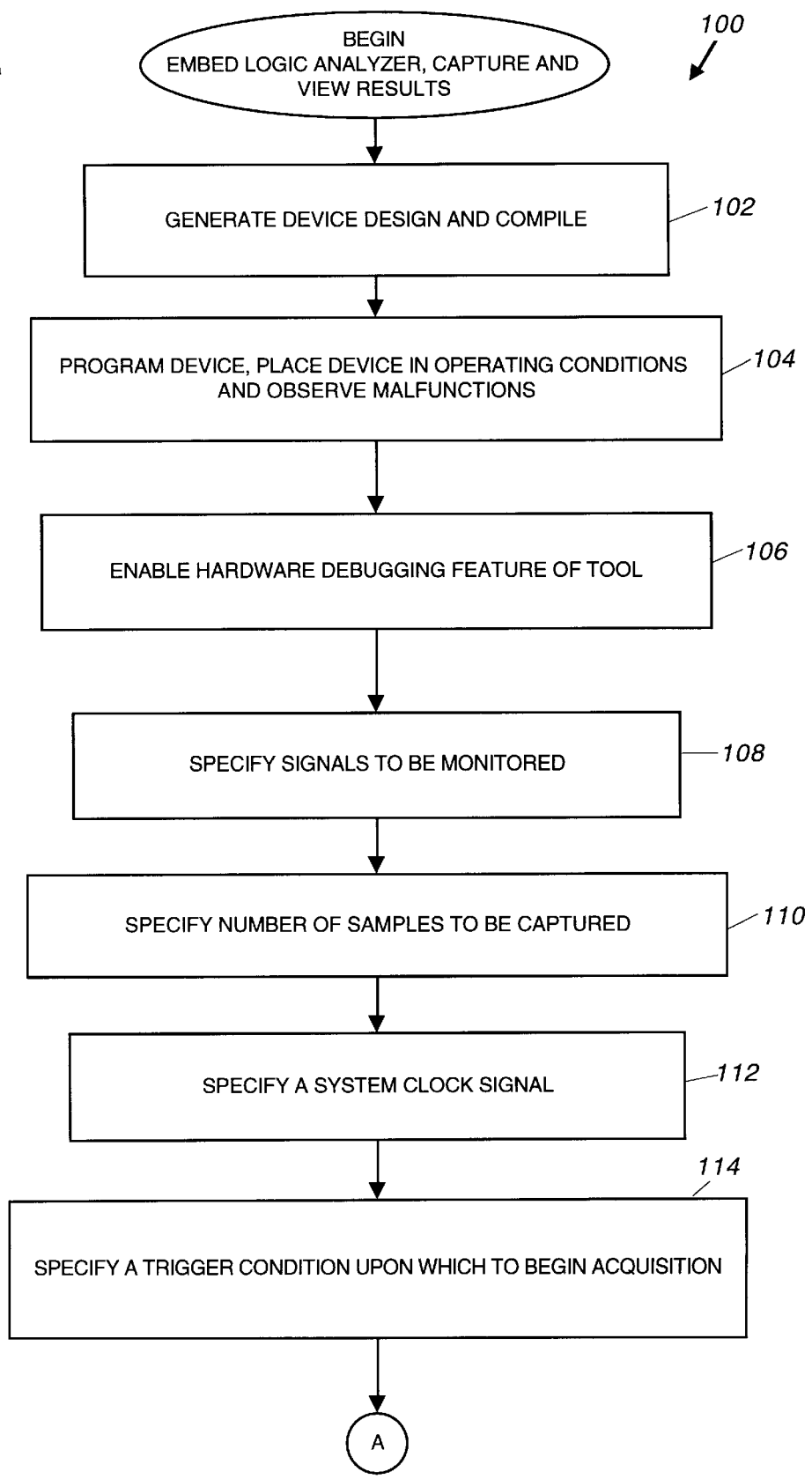
FIGS. 3A and 3B are a flowchart describing one technique by which signals are specified for a logic analyzer to be embedded within a device so that the signals may be captured and viewed by a user.
Figure 3B:
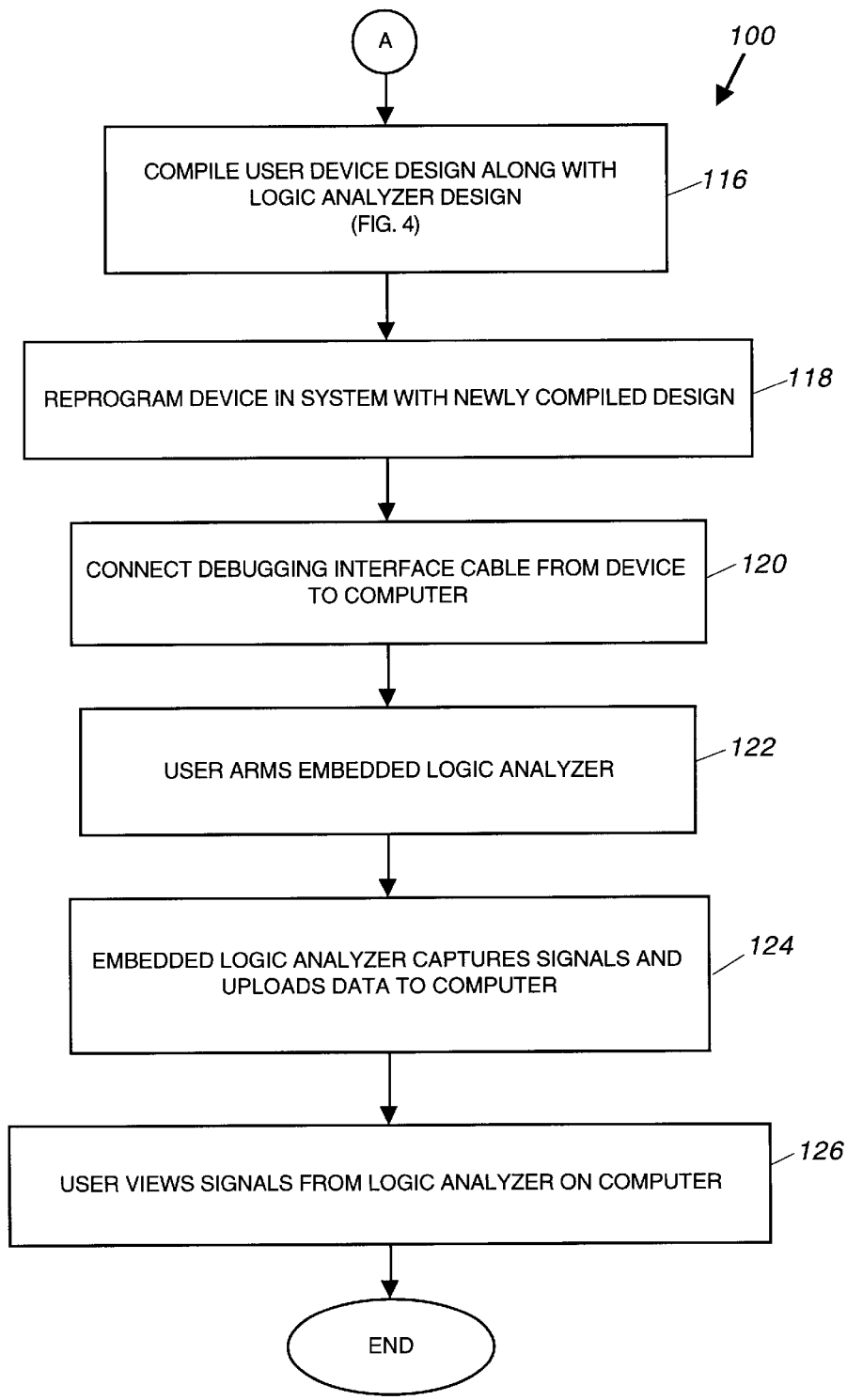

The flowchart of FIGS. 3A and 3B describe one possible technique by which a user may utilize the present invention in order to embed a logic analyzer within a PLD to capture desired signals and to view the results on a computer. In step 102 a user generates a design for a device and compiles the design into an output file. A wide variety of EDA tools may be used to generate and compile a design for a PLD. By way of example, the technique disclosed in U.S. patent Application Serial No. 60/029,277 may be used.

In step 104, the compiled output file is used to program the device and the device is placed under operating conditions, such as on a printed circuit board or within a suitable electronic system. At this step, an engineer may observe malfunctions with the device. If so, then in step 106 a hardware debugging feature of the EDA tool is enabled. This enablement will allow the EDA tool to perform netlist augmentation. That is, the engineer's design in various design files will be augmented with a logic analyzer according to one embodiment of the present invention and is described in greater detail in FIG. 4. This debugging feature also allows the combined netlist to be processed and programmed onto the device.

Figure 6:
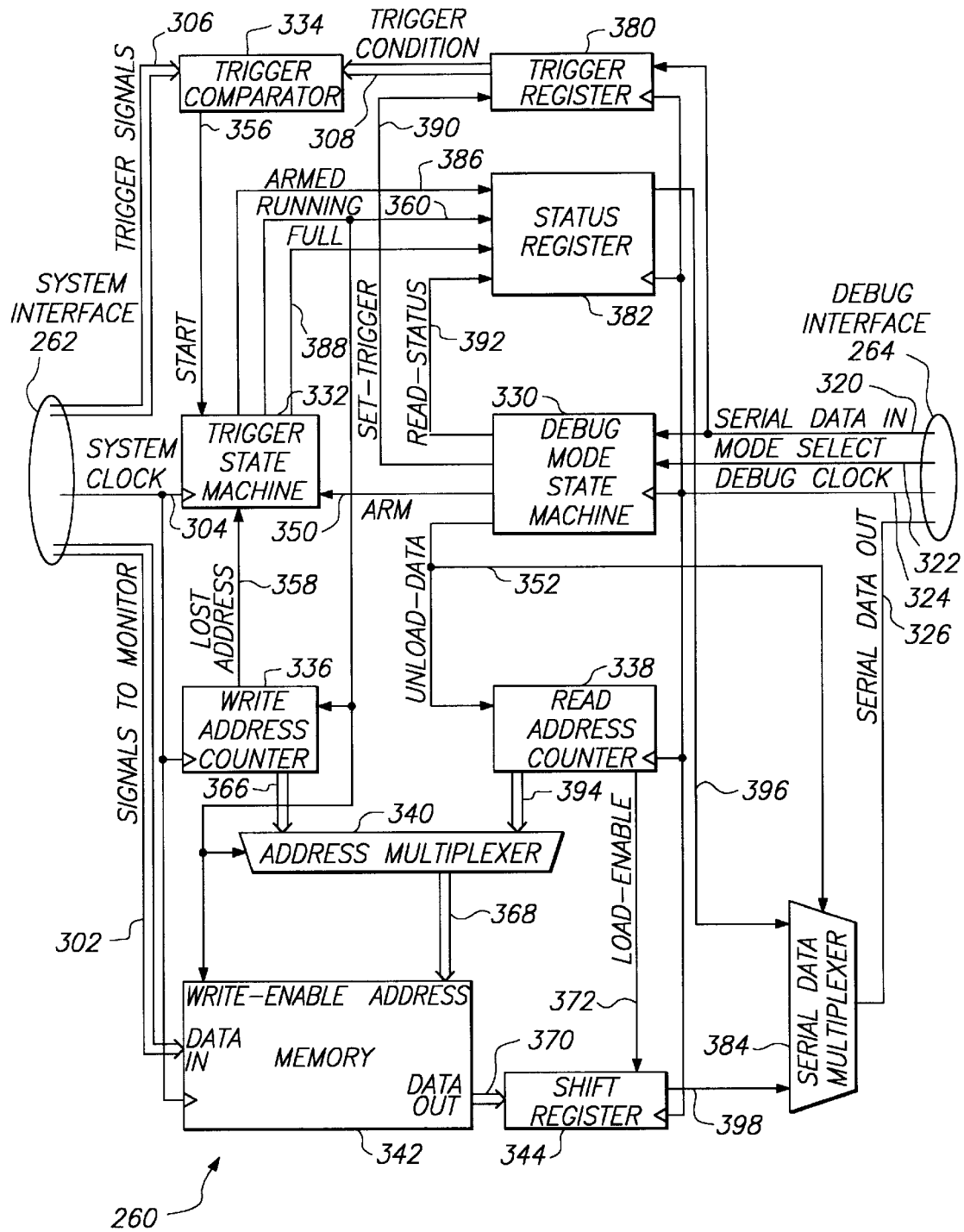
FIG. 6 is a block diagram of an embedded logic analyzer circuit according to an embodiment of the present invention.

Next, the user is able to program the logic analyzer in order to debug the device in any way that the engineer chooses. One such logic analyzer circuit is shown in FIG. 6; the design for the logic analyzer may already be present within the EDA tool, or may be generated at any time. In step 108, the signals of interest of the device to be monitored are specified. These are the signals that a user wishes to view in order to track down the cause of the malfunction. The signals may be those present on pins of the device, or any internal signals or points within the device. Often the nature of the malfunction observed in step 104 will provide a clue, suggesting signals that would likely provide further information about the problem. For example, if the malfunction is associated with data output at a particular pin, the signals to be monitored may be provided by logic upstream from the pin.

These signals to be monitored may be specified in a wide variety of ways. By way of example, a hierarchical path name for each signal may be specified, or a graphical user interface may be used to view a particular design file and to select a signal or point from within that file to be monitored. At this time, the user may also specify which pins of the device will be used as an interface to the user computer, i.e., those pins to be used to send control information to the embedded logic analyzer within the PLD and to upload captured information from the logic analyzer to the user computer.

In step 110, the number of samples to be captured are specified. In other words, the depth of the capture buffer is specified and this, in turn, indicates how many clock pulses of data will be acquired by the logic analyzer. In one embodiment of the invention, a PLD that includes embedded memory blocks (such as any of the FLEX 10K family of devices available from Altera Corporation) works well for implementing the present invention. The embedded memory blocks are easily programmed to provide relatively large buffers (as part of the logic analyzer circuit) for the storage of captured information. Embedded memory devices are not, however, necessary for the buffering of information captured. Although devices without embedded memory may be used with the present invention, they just do not lend themselves as easily to creation of relatively large buffers. In devices without embedded memory, buffers may be implemented over multiple cells, using available memory from each cell.

In step 112, a system clock signal is specified for use by the logic analyzer. Any of a variety of signals available within the device may be specified as a system clock signal. A device clock signal that is relevant to the signals being monitored will typically be chosen as a system clock signal.

In step 114, the trigger condition is specified. A trigger condition may include any number of trigger signals to monitor and the logic levels that those trigger signals must have in order for the logic analyzer to trigger. I.e., the trigger condition describes a particular state of the device. When the logic analyzer is triggered, it begins acquisition of data for the signals being monitored. Any number of trigger signals or trigger states may be specified to define the trigger condition. A trigger may be as simple as one signal changing state, or may be a complex pattern of signals or a sequence of patterns that must occur before the logic analyzer is triggered. Also, a trigger condition need not be specified in all cases; if not, the logic analyzer triggers immediately upon being armed. Advantageously, the trigger condition can be changed at any time by the user through the use of the EDA tool, and a new trigger condition can be downloaded to the embedded logic analyzer in the device without having to recompile all of the device design files. By allowing trigger conditions to be changed rapidly for a device within a system, debugging is much more efficient.

Once the user has specified how he wishes the embedded logic analyzer to function, the complete design is compiled. In step 116, the user issues a compile command in order to compile the user's device design along with the logic analyzer design that has been specified. In a preferred embodiment of the invention, the user's design files are not modified during this process. The logic analyzer design is incorporated into the output files produced. In one specific embodiment, the process shown in FIG. 4 may be used to implement step 116.

The result of this step is a new output file that includes the user design with an embedded logic analyzer. A technique by which an EDA tool may insert a custom logic analyzer in a user design will be discussed in greater detail below with reference to FIG. 4. Once the new output file has been generated, then in step 118 the device within its system is reprogrammed using the new output file.

Figure 5:
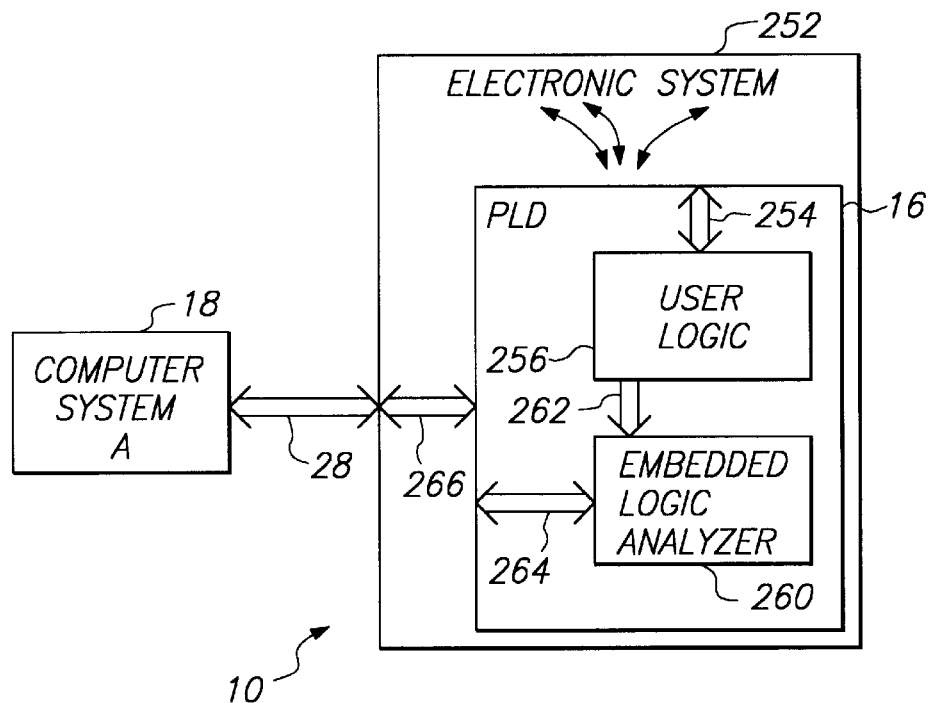
FIG. 5 is another view of the block diagram of FIG. 1, showing a programmable logic device having an embedded logic analyzer within an electronic system.

In step 120, the user connects a debugging interface cable from the device to the user computer. The interface cable may be the same cable used to program the device or it may be a dedicated cable for debugging. In one embodiment of the invention, the debugging cable connects to pins that have been specified by the user in step 108 as being dedicated to the logic analyzer circuit. In other words, if the user has specified the pins to which the debugging cable will be connected, the cable should be connected to those pins. In an alternative embodiment, the user does not have the option to specify the "debugging pins," rather the system specifies them automatically. The signals from these pins may be routed to an easily accessible location or port on the board to which the debugging cable may easily attach. The cable will be used to transmit instructions from the computer to the embedded logic analyzer, and also to upload captured information from the logic analyzer to the computer. In a preferred embodiment of the invention, the cable is a serial interface and uses as few as four pins on the device. As discussed below, FIG. 5 shows a PLD containing both a user design and an embedded logic analyzer within an electronic system. A cable is shown connecting the electronic system to an external computer.

In step 122 the user through the EDA tool arms the embedded logic analyzer with an appropriate command. This may be at the time when the user begins execution of the system in which the device is operating, although arming need not occur contemporaneously with system operation. Preferably, the user manipulates the system to duplicate previous malfunctions that the user wishes to analyze. In step 124, once the trigger condition is satisfied, the embedded logic analyzer will capture the signals specified up to a specified depth and store them in a memory of the logic analyzer. The logic analyzer is then able to upload this stored information over the serial interface cable to the user's computer. In step 126 the user is able to graphically view these signals received from the logic analyzer. In one embodiment, the signals are presented in a waveform view annotated with the names of the signals. Thus, by viewing these signals of interest on a computer, a user is able to efficiently debug a hardware device in much the same way as if an external logic analyzer had been able to be connected to these signals.

FIG. 4 is a flowchart 200 that describes a technique by which a logic analyzer circuit may be automatically inserted into, and automatically compiled along with, a user design. The technique of FIG. 4 is a suitable technique by which step 116 of FIG. 3B may be implemented (in the context of PLD compilation). It should be appreciated that a variety of compilation techniques may be used with the various EDA tools, for PLD design as well for other types of integrated circuits. The embodiment of FIG. 4 illustrates how the present invention may be used with one such compilation technique, although it is contemplated that the present invention is applicable to any of a wide variety of compilation techniques.

In step 202 an EDA tool accepts the user design files necessary to describe an electronic design for a device such as a PLD. These design files may often specify the design elements for the design. In many design environments, the design elements are arranged in a hierarchy, from root entity to leaf entities. In such cases, if the design uses a particular register in numerous locations throughout the design, there may be only one file containing the implementation of this design, yet the complete design may reference that one file in numerous locations. Examples of such electronic design files are discussed above with reference to FIGS. 1 and 2.

Step 204 takes these user design files and generates a flattened netlist representation of the user design. In other words, should the design files include a hierarchy, this hierarchy is "flattened out" so that each entity referenced in the design is duplicated as many times as it is used. Using the above example, if a particular register is used twice in the design hierarchy, yet only one file exists to describe this register, this step flattens out the design by producing two such files for the register. The representation of the user design in this step is preferably a synthesized technology-mapped database that will be appreciated by those of skill in the art. At this point in the compile process, a synthesized netlist of the user design has been created in a flattened state. Typically, generation of such a netlist is referred to as a "synthesis" step in the compilation process, after elaboration has occurred.

In step 206, a gate level representation of the logic analyzer circuit is produced. The logic analyzer circuit may take a wide variety of forms. By way of example, logic analyzer circuit 260 of FIG. 6 may be used, although it should be appreciated that a logic analyzer circuit may be implemented in many ways while still performing the functionality of the circuit shown in FIG. 6. In a preferred embodiment of the invention, a logic analyzer circuit is included in the EDA tool so that a gate level representation may be produced automatically. Alternatively, a user could be allowed to specify a custom circuit. This gate level representation takes into account each logic element of the circuit, along with the number and names of the signals to monitor specified by the user in step 108, the number of samples to be captured specified in step 110, and the trigger signals and a trigger condition as specified in step 114. Those of skill in the art will appreciate the process by which a gate level representation of a particular circuit is produced.

The actual gate level representation of a particular logic analyzer circuit will depend upon the particular device in which the logic analyzer will be embedded. By way of example, the hardware device in which to embed the logic analyzer may include any of the PLD devices available from Altera Corporation. In particular, any of the FLEX 10K, FLEX 8000, MAX 9000, or MAX 7000 devices work well. Each of these particular devices may have different features that would affect how a gate level representation for a logic analyzer is produced. For example, for a FLEX 10K device with relatively large embedded memory sections, this embedded memory is particularly well suited for implementing a large FIFO (first in first out) memory for the logic analyzer. For a device such as the FLEX 8000 without embedded memory, the memory elements (such as SRAM flip-flops) of logic cells may be used for the memory of the logic analyzer but the FIFO buffer may have to be divided over multiple cells if the memory in a single cell is not sufficiently large to accommodate the buffer. Similarly, a device based upon EEPROM technology may also use one or more of its logic cells for the logic analyzer's buffer. A device having large embedded memory works particularly well with the present invention because of the larger capacity for signal storage. Thus, step 206 produces a representation for a logic analyzer circuit that is to be connected to the user's design.

In step 208 the gate level representation of the logic analyzer circuit from step 206 is connected to the flattened representation of the user design of step 204. This step makes the logic connections from the inputs of the logic analyzer (trigger signals, system clock, signals to monitor) to lines providing the actual signals specified in the user's design. As those signals have previously been specified in steps 108 through 114, the EDA tool is able to find the particular signal lines within its database representation of the electronic design and to make the appropriate connection to an input of the logic analyzer.

In addition, this step makes appropriate connections from the logic analyzer to an interface to the user's computer. In the embodiment of FIG. 6, discussed below, this interface includes four signals available at the logic analyzer, namely: serial data in, mode select, debug clock, and serial data out. Of course, another embodiment of a logic analyzer circuit may use different signals and/or a greater or fewer number of interface signals. In a preferred embodiment of the invention, these interface signals to and from the logic analyzer are connected to four dedicated pins on the PLD reserved for this purpose. Thus, a user will know to which four pins the debugging cable should be attached. As noted, these pins not only control the embedded logic analyzer, but also receive data from it. In other embodiments, the four pins may be routed to another part of the circuit board for easy attachment of a cable. In this fashion, the logic for the logic analyzer circuit created in step 206 is connected to the user design and to interface pins of the PLD for communication with the user computer.

In step 210 the complete design created in step 208 is placed and routed in a fashion that will be appreciated by those of skill in the art. The output of the place and route step is then input to step 212 in which the output file is assembled. This output file may then be downloaded to a PLD in order to program it. Once a PLD has been programmed with this file, a user may begin use of the embedded logic analyzer in order to debug the device.

FIG. 5 is another view of programmable logic development system 10 of FIG. 1, showing a programmable logic device having an embedded logic analyzer within an electronic system. System 10 shows an electronic system 252 connected to computer system A 18 via cable 28 or other connective appliance. Electronic system 252 includes PLD 16, a component of the electronic system. PLD 16 potentially shares one or more electronic connections 254 with the other components and elements that make up the electronic system. PLD 16 has been configured with a user logic design 256 and an embedded logic analyzer 260. User logic 256 is configured with a design according to the methodology described in FIG. 2, or any other suitable design methodology. Embedded logic analyzer 260 has been incorporated into PLD 16 according to one embodiment of the invention described in FIGS. 3A and 3B.

Logical connections 262 allows signals from user logic 256 to be transmitted to logic analyzer 260. These signals may include a system clock, trigger signals, signals to monitor, etc. Pins of PLD 16 are used to connect debug interface signals 264 from the logic analyzer to corresponding connections 266 in electronic system 252. Cable 28 is used to connect these debug interface signals to computer 18. Alternatively, computer 18 may be directly connected to PLD 16 to transmit debug interface signals 264 to the PLD. In this manner, computer 18 transmits commands and other information to embedded logic analyzer 260, and receives information from the logic analyzer without directly interrupting or affecting the functional operation of electronic system 252. PLD 16 is thus configured to perform both the functions of user logic 256 and embedded logic analyzer 260

FIG. 6 is a block diagram of embedded logic analyzer 260 according to one embodiment of the present invention. A logic analyzer to be embedded within a PLD may be implemented in a wide variety of manners depending upon the type of PLD, signal type and number to be monitored, depth of data desired, memory available, control signals from the user's computer and preferences of the designing engineer, etc. By way of example, logic analyzer 260 is one particular example of how such a logic analyzer may be implemented. The embedded logic analyzer is controlled by the user from a computer external to the PLD and operates to capture any of a variety of internal signals that the user wishes.

Once logic analyzer 260 has been programmed into a PLD, it receives a variety of inputs from signals within the PLD. Collectively, these signals are called logic connections, or system interface signals 262. Signals to monitor 302 are those signals internal to the PLD that the user had specified in step 108 to be monitored by the logic analyzer. System clock 304 is the system clock specified in step 112 that the user wishes to clock input to the logic analyzer. Trigger signals 306 are those signals specified in step 114 that the user wishes to compare to a trigger condition 308 that was also specified in step 114.

Logic analyzer 260 also communicates with an external computer from which it receives commands and other information, and to which it transfers information including the current status of logic analyzer 260 and data captured from the PLD. Such communication may take place in a wide variety of forms. By way of example, in the embodiments shown, communication takes place over four pins of the PLD using a serial interface constituting a debug interface 264. Of course, any number of pins may be used to perform a similar function.

Pins 320 and 322 transmit signals "serial data in" and "mode select" from the computer to the logic analyzer. "Serial data out" pin 326 transmits data or status information from logic analyzer 260 to the external computer. The "debug clock" pin 324 is connected to a debug clock signal provided by the external computer, which is used to synchronize the serial transmission of commands, data and other information from the external computer to the logic analyzer, and from the logic analyzer to the external computer.

Furthermore, a variety of commands may be issued by the computer to the logic analyzer. In one specific embodiment, the logic analyzer recognizes four commands from the external computer. The computer may issue an "arm" command to arm the logic analyzer, a "set trigger" command to set the value of trigger condition 308, an "unload data" command to direct the logic analyzer to upload its data, or a "read status" command in order to determine the current status of the logic analyzer. Also, other information may be transmitted from the external computer to the logic analyzer, including information to prepare or configure the logic analyzer. In this embodiment, the external computer can transmit data to trigger register 380 in order to set the value of trigger condition 308.

The logic analyzer may also transmit information to the computer using these interface pins. For example, in this embodiment, the current state of trigger state machine 332 may be "armed", "running", or "full". A data value representing the current state of trigger state machine 332 may be transmitted to the computer using these pins.

It should be understood that in preferred embodiments, the computer to which pins 320, 322, 324 and 326 (or any other pins in alternative embodiments) are connected performs the analysis function of the logic analyzer. The circuitry provided on the PLD interior merely provides the data acquisition component of the logic analyzer. Of course, the logic necessary for data analysis could be provided on the PLD, in which case the external computer would be used merely to (a) control the state of the logic analyzer and (b) view information output by the logic analyzer.

Now that the inputs and outputs to the logic analyzer have been described, its functionality will now be explained. In this embodiment of the invention, logic analyzer 260 includes a debug mode state machine 330, a trigger state machine 332, a trigger comparator 334, a write address counter 336, a read address counter 338, an address multiplexer 340, a memory 342, a shift register 344, a trigger register 380, a status register 382 and a serial data multiplexer 384. Of course, variations on the design of the logic analyzer may be present depending upon a variety of factors mentioned above.

In operation, debug mode state machine 330 receives commands from the user computer and processes them. When the logic analyzer is armed and a trigger occurs, trigger state machine 332 allows write address counter 336 to step through memory addresses in memory 342 thus storing signals 302. When the user wishes to upload data from the logic analyzer, state machine 330 directs read address counter 338 to step through addresses in memory 342 and thus outputs data serially to the user computer via shift register 344. A more detailed explanation of how operation occurs now follows.

A user is able to issue the commands "arm", "set trigger", "unload data", and "read status" from a computer via signals present on debug interface 264. Debug mode state machine 330 receives and processes these commands and may be implemented in any suitable fashion. Upon receipt of an "arm" command, state machine 330 sends an "arm" signal 350 to trigger state machine 332. Upon receipt of a "set trigger" command, state machine 330 sends a set trigger signal 390 to trigger register 380, enabling it to receive data from serial data in pin 320. Trigger register 380 converts this data into a trigger condition 308 which is then sent to trigger comparator 334.

Upon receipt of an "unload data" command, state machine 330 sends a signal 352 to enable read address counter 338 to step through addresses in memory 342. This signal 352 is also sent to shift register 344 to enable it to convert the data words from memory 342 into a serial format. Signal 352 is also sent to serial data multiplexer 384 to allow the serial data output signal 398 from shift register 344 to drive the serial data out pin 326. Upon receipt of a "read status" command, debug mode state machine 330 sends a read status signal 392 to status register 382. When this signal is present, status register 382 shifts the values of status bits out on output signal 396, through serial data multiplexer 384 to serial data out pin 326. In this fashion, the external computer may issue commands to the logic analyzer, transmit data to the logic analyzer, and receive data from the logic analyzer via debug interface 264. In particular, the external computer may determine the status of the logic analyzer at any time via debug interface 264.

When the user has issued a "set trigger" command, debug mode state machine 330 sends "set trigger" signal 390 to trigger register 380. Trigger register 380 may be implemented as a shift register which converts serial data from the serial data in signal 320 into a parallel format, which is stored as trigger condition 308. Alternatively, serial data from serial data in signal 320 could be used to select the value of trigger condition 308 using any suitable method. For example, in one specific embodiment, a particular value of trigger condition 308 is established as the default value before the logic analyzer is compiled and programmed into the PLD, and the serial data loaded into the trigger register is used to modify the individual signals of trigger condition 308. This method is advantageous because it permits the default trigger condition to be active without loading the trigger register at all.

Trigger state machine 332 may be implemented in a wide variety of ways; in a preferred embodiment, state machine 332 is a synchronous state machine. The inputs to state machine 332 are system clock 304, "arm" signal 350, a "start" signal 356 and a "last address" signal 358. State machine 332 has four states: "never armed"; "armed and waiting for trigger"; "triggered and running"; and "complete, memory full". The "never armed" state occurs when the logic analyzer is first embedded in a device and the user has not yet armed it. The "armed and waiting for trigger" state occurs once the user delivers an "arm" command, and the "triggered and running" state occurs once a trigger condition is met. When the memory of the logic analyzer is full (depending upon the number of samples that the user wishes to capture), then the trigger state machine enters the "complete, memory full" state.

Trigger comparator 334 compares trigger signals 306 and their associated logic state to trigger condition 308. When the two match, a trigger has occurred and logic 334 issues "start" signal 356 to state machine 332. If trigger state machine 332 is armed then upon receipt of "start" signal 356, state machine 332 issues a "running" signal 360 to enable counter 336 to step through addresses in memory 342. The "running" signal 360 is also sent to memory 342, enabling memory 342 to capture and store the signals to monitor 302. Once counter 336 has reached the last address in memory 342, it issues "last address" signal 358 to state machine 332. Thus, based upon its various inputs, state machine 332 is maintained in one of the four states and also indicates this state via state signals 360, 386 and 388 to status register 382.

Write address counter 336 passes its address through address multiplexer 340 before being delivered as address 368 to memory 342. Address multiplexer 340 may be any suitable type of multiplexer. The "running" signal 360 from state machine 332 also serves as a select signal to address multiplexer 340 to control whether write addresses or read addresses are passed through to memory 342. When trigger state machine 332 is in the "running" state it sends the "running" signal 360 to address multiplexer 340, causing it to connect the write address 366 to the address 368 of memory 342. Otherwise the read address 394 is connected to address 368 of memory 342.

In this example, memory 342 has a width representing symbolically the depth, or number of samples to store in memory, while the height of memory 342 represents symbolically the size of a word stored. The number of samples stored in memory 342 also indicates the sizes of counters 336 and 338. Memory 342 may be implemented in a wide variety of ways. By way of example, in one embodiment of the invention, logic analyzer 260 is embedded in a FLEX 10K PLD available from Altera Corporation. This particular PLD contains embedded SRAM memory in which it is useful to implement memory 342. Of course, memory 342 may be implemented in many other types of PLDs that do not contain extra embedded memory. In this example, memory 342 is implemented as a first-in first-out (FIFO) memory. Memory 342 stores signals 302 when "running" signal 360 enables the memory for writing.

When the user has issued an "unload data" command, debug mode state machine 330 sends "unload data" signal 352 to enable read address counter 338 to begin counting. Address 394 passes through address multiplexer 340 to select successive words in memory 342. A word at a time 370 is transferred from memory 342 into shift register 344. Shift register 344 (also called a parallel-to-serial converter) may be of any size and implemented in any fashion. Words of any size may also be stored in memory 342 and transmitted to an external computer either via serial or a parallel interface. Shift register 344 is loaded via load enable signal 372 and shifts out a bit at a time using debug clock 324 functioning as a bit clock. Load enable signal 372 is sent by read address counter 338 to shift register 344 each time the value of address 394 is changed, to cause shift register 344 to load the corresponding data word 370 from memory 342. Read address counter 338 increments address 394 every N cycles of debug clock 324 where N is the number of signals in data word 370. Successive words from memory 342 are shifted serially out via serial data signal 398, through serial data multiplexer 384 to serial data out pin 326. When "unload data" signal 352 is active, serial data multiplexer 384 connects shift register output signal 398 to serial data out pin 326. Otherwise it connects status register output signal 396 to serial data out pin 326. In this manner, signals stored in memory 342 after a trigger condition may eventually be transferred to an external computer.

Computer System Embodiment

Figure 7:
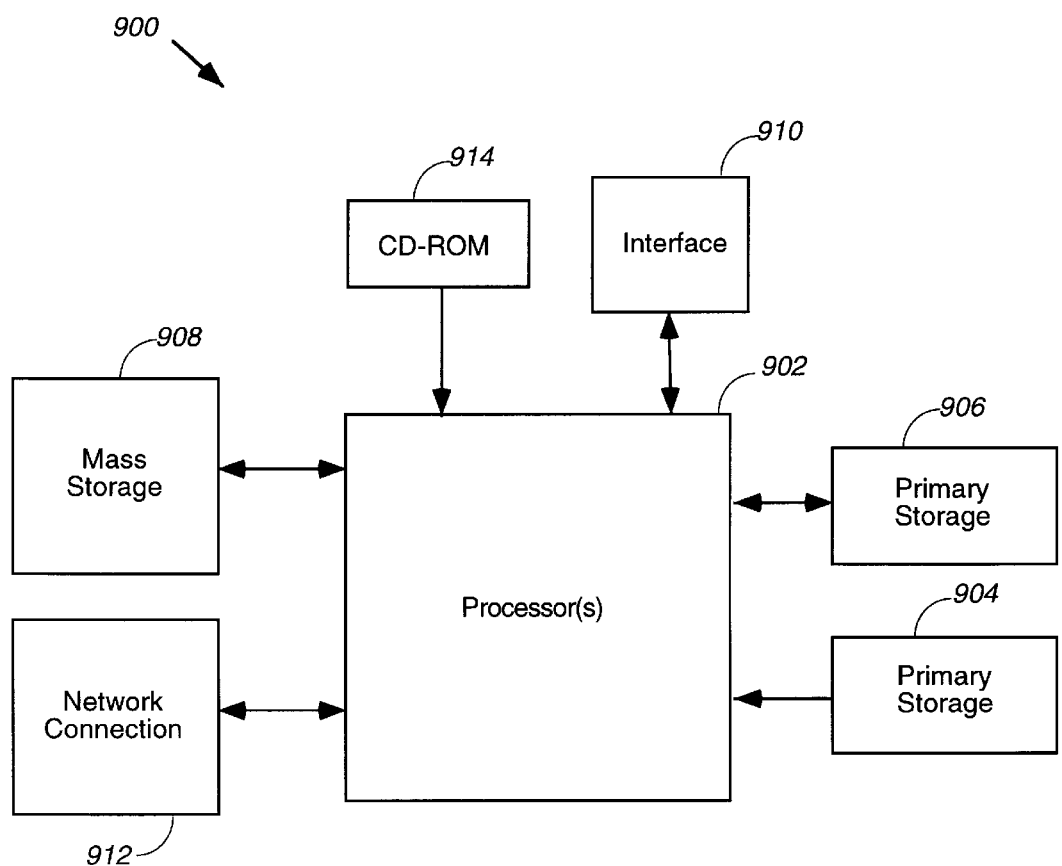
FIG. 7 is a block diagram of a typical computer system suitable for implementing an embodiment of the present invention.

FIG. 7 illustrates a computer system 900 in accordance with an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, a logic analyzer may be embedded in any suitable device or circuit board that lends itself to being programmed. Also, the present invention is applicable to any type of EDA tool that is able to compile a user design. Although only one example of compilation of a logic analyzer is presented, variations on this compile technique may occur depending upon the device for which the design is being compiled and still take advantage of the present invention. Furthermore, the specific logic analyzer circuit shown is exemplary; other circuits may also be used to implement a logic analyzer. An interface to the logic analyzer from a computer may use any number of pins and any type of protocol such as serial, parallel, etc. Therefore, the described embodiments should be taken as illustrative and not restrictive, and the invention should not be limited to the details given herein but should be defined by the following claims and their full scope of equivalents.

We claim:

1. A computer storage product including a computer-usable medium having computer-readable program code embodied thereon for compiling a logic analyzer along with an electronic design, said computer storage product comprising computer-readable program code for effecting the following method:

receiving an electronic design for a programmable logic device (PLD), said electronic design including a plurality of nodes;

modifying said electronic design to include a logic analyzer circuit to be embedded in said PLD, said logic analyzer circuit including design inputs for connecting to selected ones of said nodes from said electronic design; and compiling said electronic design along with said logic analyzer circuit such that said selected nodes of said electronic design are connected to said design inputs of said logic analyzer circuit and a complete design is produced for programming said PLD, whereby said logic analyzer circuit is arranged to store signals from said selected nodes when said logic analyzer circuit is embedded in said PLD.

2. A computer storage product as recited in claim 1, said method further including:
  receiving a name of a trigger signal, said trigger signal corresponding to one of said nodes;
  receiving a trigger condition for said logic analyzer circuit; and
  said compiling step further including the sub-steps of:
    connecting a line providing said trigger signal to a trigger input of said logic analyzer circuit,
    including said trigger condition in said complete design,
  such that when said trigger signal matches said trigger condition in said PLD said logic analyzer circuit is arranged to begin storing said signals when said logic analyzer circuit is embedded in said PLD.

3. A computer storage product as recited in claim 1, wherein said logic analyzer circuit includes a logic analyzer memory, said PLD includes embedded memory, and wherein said step of compiling said electronic design includes the sub-step of:
  implementing said logic analyzer memory in said embedded memory, whereby said signals are rendered capable of being buffered in said embedded memory of said PLD.

4. A computer storage product as recited in claim 1, wherein said step of compiling said electronic design includes the sub-step of:
  connecting lines providing interface signals of said logic analyzer circuit to dedicated pins of said PLD in said electronic design, whereby a user computer is rendered connectable to said dedicated pins to communicate with said logic analyzer circuit when said logic analyzer circuit is embedded in said PLD.

5. A computer storage product as recited in claim 1, said method further including:
  programming said PLD with said complete design; and
  issuing an arm command to said logic analyzer circuit in said PLD such that said logic analyzer circuit is armed to monitor said selected nodes of said PLD and to store said signals in a memory of said logic analyzer circuit.

6. A computer storage product as recited in claim 5, said method further including:
  issuing an unload data command to said logic analyzer circuit in said PLD; and
  receiving said stored signals from said memory of said logic analyzer circuit such that said stored signals are rendered capable of being viewed on a user computer.

7. A computer storage product as recited in claim 1, wherein said logic analyzer circuit includes a first trigger condition, said method further including:
  programming said PLD with said complete design;
  sending a second trigger condition to said logic analyzer circuit embedded in said PLD to replace said first trigger condition without recompiling said complete design, whereby said logic analyzer circuit is arranged to begin monitoring said selected nodes upon occurrence of said second trigger condition.

8. A computer storage product as recited in claim 1, wherein said selected nodes include original nodes, said method further including:
  programming said PLD with said complete design such that said logic analyzer circuit is embedded in said PLD;
  receiving names of new nodes, said new nodes being different from said original nodes;
  recompiling said complete design such that said new nodes are connected to said design inputs of said logic analyzer circuit; and
  reprogramming said PLD with said recompiled complete design, whereby said embedded logic analyzer circuit is arranged to monitor said new nodes.

9. A computer storage product including a computer-usable medium having computer-readable program code embodied thereon for retrieving data stored in a logic analyzer embedded in a programmable logic device (PLD), said computer storage product comprising computer-readable program code for effecting the following method:
  compiling an electronic design and automatically inserting a logic analyzer to produce a complete design file;
  programming a PLD with said complete design file, said logic analyzer being embedded in said PLD;
  arming said logic analyzer in said PLD such that said logic analyzer is arranged to monitor internal nodes of said PLD and to store internal signals from said internal nodes in a memory of said logic analyzer;
  issuing an unload data command to said logic analyzer in said PLD; and receiving said stored internal signals from said memory of said logic analyzer such that said stored internal signals are rendered capable of being viewed on a user computer.

10. A computer storage product as recited in claim 9, wherein said method further including:
  receiving a name of a trigger signal, said trigger signal corresponding to one of said internal signals of said PLD;
  receiving a trigger condition for said logic analyzer; and
  said compiling step further including the sub-steps of:
    connecting said trigger signal to a trigger input of said logic analyzer,
    including said trigger condition in said complete design file,
  such that when said trigger signal matches said trigger condition in said PLD said logic analyzer is arranged to begin storing said internal signals when said logic analyzer is embedded in said PLD.

11. A computer storage product as recited in claim 9, wherein said logic analyzer includes a logic analyzer memory, said PLD includes embedded memory, and wherein said step of compiling includes the sub-step of:
  implementing said logic analyzer memory in said embedded memory, whereby said monitored internal signals are rendered capable of being stored in said embedded memory of said PLD.

12. A computer storage product as recited in claim 9, wherein said step of compiling includes the sub-step of:
  connecting interface signals of said logic analyzer to dedicated pins of said PLD, whereby a user computer is rendered connectable to said dedicated pins to communicate with said logic analyzer embedded in said PLD.

13. A computer storage product as recited in claim 9, wherein said logic analyzer includes a first trigger condition, said method further including:
  sending a second trigger condition to said logic analyzer embedded in said PLD to replace said first trigger condition without recompiling said complete design, whereby said logic analyzer is arranged to begin monitoring said internal nodes upon occurrence of said second trigger condition.

14. A computer storage product as recited in claim 9, wherein said internal nodes include original nodes, said method further including:

receiving names of new nodes different from said original nodes;

recompiling said complete design such that said logic analyzer is arranged to monitor said new nodes; and reprogramming said PLD with said recompiled complete design, whereby said embedded logic analyzer is arranged to monitor said new nodes.

15. A computer storage product including a computer-usable medium having computer-readable program code embodied thereon for automatically compiling a logic analyzer along with an electronic design, said computer storage product comprising computer-readable program code for effecting the following method:

identifying a user design file representing an electronic design for a programmable logic device (PLD);

generating a netlist representation of said electronic design;

producing a gate level representation of a logic analyzer circuit, said logic analyzer circuit including design inputs for receiving input signals from said electronic design, and interface signals for communicating with a user computer;

connecting said gate level representation of said logic analyzer circuit to said netlist representation of said electronic design to produce a complete design, said design inputs of said logic analyzer circuit being connected to corresponding said input signals of said electronic design; and placing and routing said complete design to produce an output file capable of being used to program said PLD with said electronic design and including said logic analyzer circuit, whereby said logic analyzer circuit is used to monitor said input signals of said PLD.

16. A computer storage product as recited in claim 15, wherein said input signals include a trigger signal and signals to monitor, said method further including:

receiving a name of said trigger signal and names of said signals to monitor;

receiving a trigger condition for said logic analyzer circuit; and said connecting step further including the sub-steps of:
connecting said trigger signal to a trigger input of said logic analyzer circuit,
including said trigger condition in said complete design, such that when said trigger signal matches said trigger condition in said PLD said logic analyzer circuit is arranged to begin storing said signals to monitor when said logic analyzer circuit is embedded in said PLD.

17. A computer storage product as recited in claim 15, wherein said logic analyzer circuit includes a logic analyzer memory, said PLD includes embedded memory, and wherein said step of producing a gate level representation includes the sub-step of:

implementing said logic analyzer memory in said embedded memory, whereby said input signals are rendered capable of being stored in said embedded memory of said PLD.

18. A computer storage product as recited in claim 15, wherein said step of connecting said gate level representation includes the sub-step of:

connecting said interface signals of said logic analyzer circuit to dedicated pins of said PLD in said electronic design, whereby a user computer is rendered connectable to said dedicated pins to communicate with said logic analyzer circuit in said PLD.

19. A computer storage product as recited in claim 15, said method further including:

programming said PLD with said complete design; and issuing an arm command from a user computer via said interface signals to said logic analyzer circuit in said PLD such that said logic analyzer circuit is arranged to monitor said input signals of said PLD and to store said input signals in a memory of said logic analyzer circuit.

20. A computer storage product as recited in claim 19, said method further including:

issuing an unload command from said user computer via said interface signals to said logic analyzer circuit in said PLD; and receiving said stored input signals from said memory of said logic analyzer circuit via said interface signals such that said stored input signals are rendered capable of being viewed on said user computer.

21. A computer storage product as recited in claim 15, wherein said logic analyzer circuit includes a first trigger condition, said method further including:

programming said PLD with said complete design; and sending a second trigger condition via said interface signals to replace said first trigger condition in said logic analyzer circuit without recompiling said complete design, whereby said logic analyzer circuit is arranged to begin monitoring said input signals upon occurrence of said second trigger condition.

22. A computer storage product as recited in claim 15, wherein said input signals include original signals to monitor, said method further including:

programming said PLD with said complete design such that said logic analyzer circuit is embedded in said PLD;

receiving new signals to monitor different from said original signals to monitor;

recompiling said complete design such that said new signals to monitor replace said original signals to monitor in said logic analyzer circuit; and reprogramming said PLD with said recompiled complete design, whereby said embedded logic analyzer circuit is arranged to monitor said new signals to monitor.

23. A computer-implemented method of compiling a logic analyzer along with an electronic design, said method comprising the steps of:

receiving an electronic design for a programmable logic device (PLD), said electronic design including a plurality of nodes;

modifying said electronic design to include a logic analyzer circuit to be embedded in said PLD, said logic analyzer circuit including design inputs for connecting to selected ones of said nodes from said electronic design; and compiling said electronic design along with said logic analyzer circuit such that said selected nodes of said electronic design are connected to said design inputs of said logic analyzer circuit and a complete design is produced for programming said PLD, whereby said logic analyzer circuit is arranged to store signals from said selected nodes when said logic analyzer circuit is embedded in said PLD.

24. A method as recited in claim 23, said method further including:
receiving a name of a trigger signal, said trigger signal corresponding to one of said nodes;
receiving a trigger condition for said logic analyzer circuit; and
said compiling step further including the sub-steps of:
connecting a line providing said trigger signal to a trigger input of said logic analyzer circuit,
including said trigger condition in said complete design,
such that when said trigger signal matches said trigger condition in said PLD said logic analyzer circuit is arranged to begin storing said signals when said logic analyzer circuit is embedded in said PLD.

25. A method as recited in claim 23, wherein said logic analyzer circuit includes a logic analyzer memory, said PLD includes embedded memory, and wherein said step of compiling said electronic design includes the sub-step of:
implementing said logic analyzer memory in said embedded memory, whereby said signals are rendered capable of being buffered in said embedded memory of said PLD.

26. A method as recited in claim 23, wherein said step of compiling said electronic design includes the sub-step of:
connecting lines providing interface signals of said logic analyzer circuit to dedicated pins of said PLD in said electronic design, whereby a user computer is rendered connectable to said dedicated pins to communicate with said logic analyzer circuit when said logic analyzer circuit is embedded in said PLD.

27. A method as recited in claim 23, said method further including:
programming said PLD with said complete design; and
issuing an arm command to said logic analyzer circuit in said PLD such that said logic analyzer circuit is armed to monitor said selected nodes of said PLD and to store said signals in a memory of said logic analyzer circuit.

28. A method as recited in claim 27, said method further including:
issuing an unload data command to said logic analyzer circuit in said PLD; and
receiving said stored signals from said memory of said logic analyzer circuit such that said stored signals are rendered capable of being viewed on a user computer.

29. A method as recited in claim 23, wherein said logic analyzer circuit includes a first trigger condition, said method further including:
programming said PLD with said complete design;
sending a second trigger condition to said logic analyzer circuit embedded in said PLD to replace said first trigger condition without recompiling said complete design, whereby said logic analyzer circuit is arranged to begin monitoring said selected nodes upon occurrence of said second trigger condition.

30. A method as recited in claim 23, wherein said selected nodes include original nodes, said method further including:
programming said PLD with said complete design such that said logic analyzer circuit is embedded in said PLD;
receiving names of new nodes, said new nodes being different from said original nodes;
recompiling said complete design such that said new nodes are connected to said design inputs of said logic analyzer circuit; and
reprogramming said PLD with said recompiled complete design, whereby said embedded logic analyzer circuit is arranged to monitor said new nodes.

31. A computer-implemented method of retrieving data stored in a logic analyzer embedded in a programmable logic device (PLD), said method comprising the steps of:
compiling an electronic design and automatically inserting a logic analyzer to produce a complete design file;
programming a PLD with said complete design file, said logic analyzer being embedded in said PLD;
arming said logic analyzer in said PLD such that said logic analyzer is arranged to monitor internal signals of said PLD and to store said internal signals in a memory of said logic analyzer;
issuing an unload data command to said logic analyzer in said PLD; and
receiving said stored internal signals from said memory of said logic analyzer such that said stored internal signals are rendered capable of being viewed on a user computer.

32. A computer-implemented method of automatically compiling a logic analyzer along with an electronic design, said method comprising the steps of:
identifying a user design file representing an electronic design for a programmable logic device (PLD);
generating a netlist representation of said electronic design;
producing a gate level representation of a logic analyzer circuit, said logic analyzer circuit including design inputs for receiving input signals from said electronic design, and interface signals for communicating with a user computer;
connecting said gate level representation of said logic analyzer circuit to said netlist representation of said electronic design to produce a complete design, said design inputs of said logic analyzer circuit being connected to corresponding said input signals of said electronic design; and
placing and routing said complete design to produce an output file capable of being used to program said PLD with said electronic design and including said logic analyzer circuit, whereby said logic analyzer circuit is used to monitor said input signals of said PLD.

33. A computer-implemented method of making a programmable logic device (PLD) comprising the steps of:
receiving an electronic design for a PLD, said electronic design including a plurality of nodes;
modifying said electronic design to include a logic analyzer circuit to be embedded in said PLD, said logic analyzer circuit including design inputs for connecting to selected ones of said nodes from said electronic design; and
compiling said electronic design along with said logic analyzer circuit to produce a complete design output file such that said selected nodes of said electronic design are connected to said design inputs of said logic analyzer circuit.

34. A method as recited in claim 33, further comprising the step of:
programming said PLD with said complete design output file, whereby said embedded logic analyzer circuit of said PLD is arranged to store said signals from said selected nodes.

35. A method as recited in claim 33, wherein said logic analyzer circuit includes a data acquisition portion of a logic analyzer, whereby data acquired by said logic analyzer circuit is made available to a separate analysis portion of said logic analyzer.

36. A programmable logic device (PLD) formed by a computer-implemented method comprising the steps of:
receiving an electronic design for a PLD, said electronic design including a plurality of nodes;
modifying said electronic design to include a logic analyzer circuit to be embedded in said PLD, said logic analyzer circuit including design inputs for connecting to selected ones of said nodes from said electronic design;
compiling said electronic design along with said logic analyzer circuit to produce a complete design output file such that said selected nodes of said electronic design are connected to said design inputs of said logic analyzer circuit; and
programming said PLD with said complete design output file, whereby said embedded logic analyzer circuit of said PLD is arranged to store signals from said selected nodes.

37. A programmable logic device (PLD) as recited in claim 36, said method for forming said PLD further comprising:
receiving a name of a trigger signal, said trigger signal corresponding to one of said nodes;
receiving a trigger condition for said logic analyzer circuit; and
said compiling step further including the sub-steps of:
connecting a line providing said trigger signal to a trigger input of said logic analyzer circuit,
including said trigger condition in said complete design,
such that when said trigger signal matches said trigger condition in said PLD said logic analyzer circuit is arranged to begin storing said signals when said logic analyzer circuit is embedded in said PLD.

38. A programmable logic device (PLD) as recited in claim 36 wherein said logic analyzer circuit includes a logic analyzer memory, said PLD includes embedded memory, and wherein said step of compiling said electronic design includes the sub-step of:
implementing said logic analyzer memory in said embedded memory, whereby said signals are rendered capable of being buffered in said embedded memory of said PLD.

39. A programmable logic device (PLD) as recited in claim 36, wherein said step of compiling said electronic design includes the sub-step of:
connecting lines providing interface signals of said logic analyzer circuit to dedicated pins of said PLD in said electronic design, whereby a user computer is rendered connectable to said dedicated pins to communicate with said logic analyzer circuit when said logic analyzer circuit is embedded in said PLD.

40. A programmable logic device (PLD) as recited in claim 36, said method for forming said PLD further comprising:
programming said PLD with said complete design; and
issuing an arm command to said logic analyzer circuit in said PLD such that said logic analyzer circuit is armed to monitor said selected nodes of said PLD and to store said signals in a memory of said logic analyzer circuit.

41. A programmable logic device (PLD) as recited in claim 40, said method for forming said PLD further comprising:
issuing an unload data command to said logic analyzer circuit in said PLD; and
receiving said stored signals from said memory of said logic analyzer circuit such that said stored signals are rendered capable of being viewed on a user computer.

42. A programmable logic device (PLD) as recited in claim 36, wherein said logic analyzer circuit includes a first trigger condition, said method for forming said PLD further comprising:
programming said PLD with said complete design; and
sending a second trigger condition to said logic analyzer circuit embedded in said PLD to replace said first trigger condition without recompiling said complete design, whereby said logic analyzer circuit is arranged to begin monitoring said selected nodes upon occurrence of said second trigger condition.

43. A programmable logic device (PLD) as recited in claim 36, wherein said selected nodes include original nodes, said method further including:
programming said PLD with said complete design such that said logic analyzer circuit is embedded in said PLD;
receiving names of new nodes, said new nodes being different from said original nodes;
recompiling said complete design such that said new nodes are connected to said design inputs of said logic analyzer circuit; and
reprogramming said PLD with said recompiled complete design, whereby said embedded logic analyzer circuit is arranged to monitor said new nodes.

44. A test programmable logic device (PLD) comprising:
PLD circuitry representing one iteration of an electronic design in a design process to create a final PLD, said PLD circuitry having an I/O region including a plurality of pins and interior circuitry that is not directly connected to said pins; and
logic analyzer circuitry integrated in the interior circuitry such that a portion of said interior region is connected to one or more of said pins through said logic analyzer circuitry.

45. The test programmable logic device of claim 44 wherein said logic analyzer circuitry consists of a data acquisition portion of a logic analyzer, whereby data acquired by said logic analyzer circuit is made available to a separate analysis portion of said logic analyzer.

46. A programmable logic development system suitable for debugging a programmable logic device (PLD), said system comprising:
a PLD arranged to accept electrical programming signals to program said PLD with a debugging electronic design;
a programming unit in electrical communication with said PLD and arranged to deliver said electrical programming signals to said PLD; and
a computer in electrical communication with said programming unit, said computer being arranged to automatically connect a logic analyzer circuit design to a user electronic design to produce said debugging electronic design, and to program said PLD with said debugging electronic design by way of said electrical programming signals, whereby said PLD includes said user electronic design and said logic analyzer circuit and internal signals of said user electronic design are captured by said logic analyzer circuit and transmitted external to said PLD for viewing by a user.

47. A method of providing a programmable logic device (PLD) development environment to debug a PLD, said method comprising the steps of:

providing a PLD suitable for accepting electrical programming signals to program said PLD with a debugging electronic design;

providing a programming unit suitable for delivering electrical programming signals to said PLD;

providing an interface cable suitable for delivering said electrical programming signals from a computer to said programming unit; and providing a computer-readable medium embodying a software program suitable for execution on said computer; said software program being arranged to automatically connect a logic analyzer circuit design to a user electronic design to produce said debugging electronic design, and to program said PLD with said debugging electronic design by way of said electrical programming signals, whereby said PLD includes said user electronic design and said logic analyzer circuit and internal signals of said user electronic design are captured by said logic analyzer circuit and transmitted external to said PLD for viewing by a user.

48. A computer-implemented method of automatically compiling a logic analyzer along with an electronic design comprising:

identifying a user design file representing a portion an electronic design for a programmable logic device (PLD), said PLD including embedded memory;

generating a netlist representation of said electronic design;

producing a gate level representation of a logic analyzer circuit, said logic analyzer circuit including design inputs for receiving input signals from said electronic design, and interface signals for communicating with a user computer, and also including a logic analyzer memory circuit;

implementing said logic analyzer memory circuit in said embedded memory of said PLD, such that said input signals may be stored in said embedded memory of said PLD;

connecting said gate level representation of said logic analyzer circuit to said netlist representation of said electronic design to produce a complete design, said design inputs of said logic analyzer circuit being connected to corresponding said input signals of said electronic design; and placing and routing said complete design to produce an output file capable of being used to program said PLD with said electronic design and including said logic analyzer circuit, whereby said logic analyzer circuit is used to monitor said input signals of said PLD.

49. A computer-implemented method of compiling a logic analyzer along with an electronic design, said method comprising the steps of:

receiving an electronic design for a programmable logic device (PLD), said electronic design including a plurality of nodes, said PLD including embedded memory;

supplementing said electronic design to include a logic analyzer circuit to be embedded in said PLD, said logic analyzer circuit including design inputs for connecting to selected ones of said nodes from said electronic design, and also including a logic analyzer memory circuit;

compiling said electronic design along with said logic analyzer circuit such that said selected nodes of said electronic design are connected to said design inputs of said logic analyzer circuit and a complete design is produced for programming said PLD; and implementing said logic analyzer memory circuit in said embedded memory of said PLD, whereby said logic analyzer circuit is arranged to store signals from said selected nodes in said embedded memory when said logic analyzer circuit is embedded in said PLD.

50. A computer-readable medium comprising computer code for automatically compiling a logic analyzer along with an electronic design, said computer code of said computer-readable medium effecting the following:

identifying a user design file representing a portion an electronic design for a programmable logic device (PLD), said PLD including embedded memory;

generating a netlist representation of said electronic design;

producing a gate level representation of a logic analyzer circuit, said logic analyzer circuit including design inputs for receiving input signals from said electronic design, and interface signals for communicating with a user computer, and also including a logic analyzer memory circuit;

implementing said logic analyzer memory circuit in said embedded memory of said PLD, such that said input signals may be stored in said embedded memory of said PLD;

connecting said gate level representation of said logic analyzer circuit to said netlist representation of said electronic design to produce a complete design, said design inputs of said logic analyzer circuit being connected to corresponding said input signals of said electronic design; and placing and routing said complete design to produce an output file capable of being used to program said PLD with said electronic design and including said logic analyzer circuit, whereby said logic analyzer circuit is used to monitor said input signals of said PLD.

51. A computer-readable medium comprising computer code for compiling a logic analyzer along with an electronic design, said computer code of said computer-readable medium effecting the following:

receiving an electronic design for a programmable logic device (PLD), said electronic design including a plurality of nodes, said PLD including embedded memory;

supplementing said electronic design to include a logic analyzer circuit to be embedded in said PLD, said logic analyzer circuit including design inputs for connecting to selected ones of said nodes from said electronic design, and also including a logic analyzer memory circuit;

compiling said electronic design along with said logic analyzer circuit such that said selected nodes of said electronic design are connected to said design inputs of said logic analyzer circuit and a complete design is produced for programming said PLD; and implementing said logic analyzer memory circuit in said embedded memory of said PLD, whereby said logic analyzer circuit is arranged to store signals from said selected nodes in said embedded memory when said logic analyzer circuit is embedded in said PLD.

* * * * *